Figure 1:
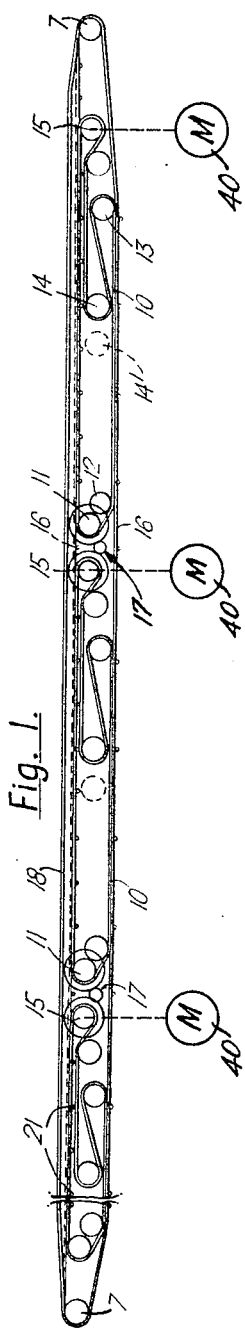

Aug. 23, 1966     C. THOMSON     3,268,065
COUPLED DRIVE MEANS FOR BELT CONVEYORS
Filed Dec. 23, 1963     3 Sheets-Sheet 1

Inventor
Charles Thomson
By Stevens, Davis, Miller & Mosher
Attorneys

Aug. 23, 1966 C. THOMSON 3,268,065
COUPLED DRIVE MEANS FOR BELT CONVEYORS
Filed Dec. 23, 1963 3 Sheets-Sheet 2
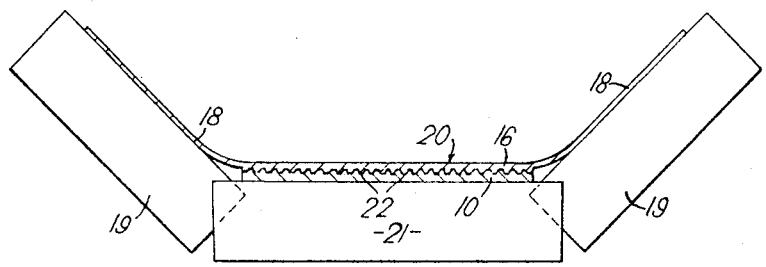
Fig. 2.
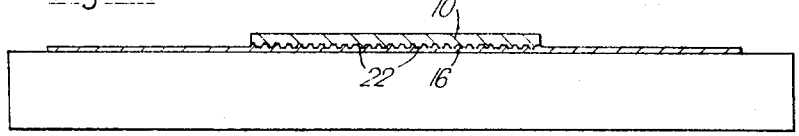
Fig. 8.
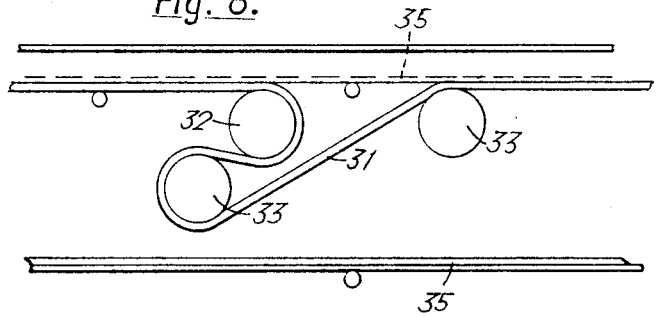
Fig. 9.
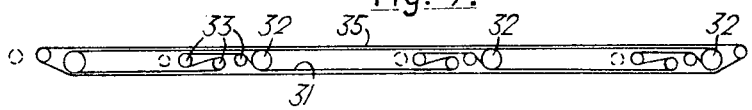
Fig. 10.
Inventor
Charles Thomson
By Stevens, Davis, Miller & Mosher
Attorneys Aug. 23, 1966  C. THOMSON  3,268,065
COUPLED DRIVE MEANS FOR BELT CONVEYORS
Filed Dec. 23, 1963  3 Sheets-Sheet 3
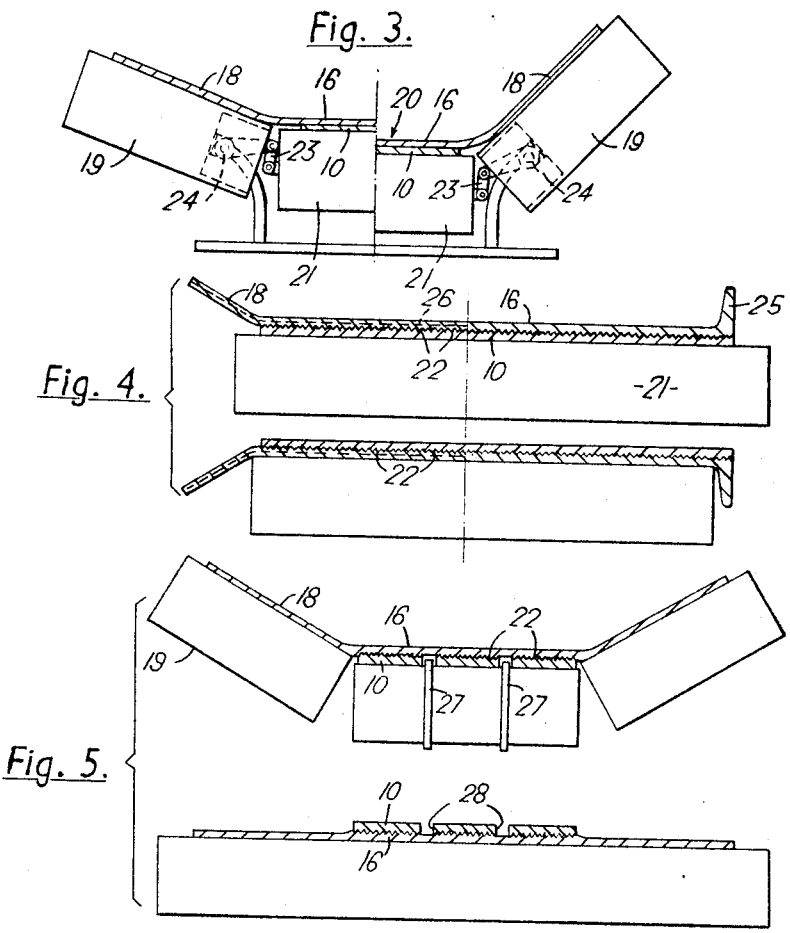
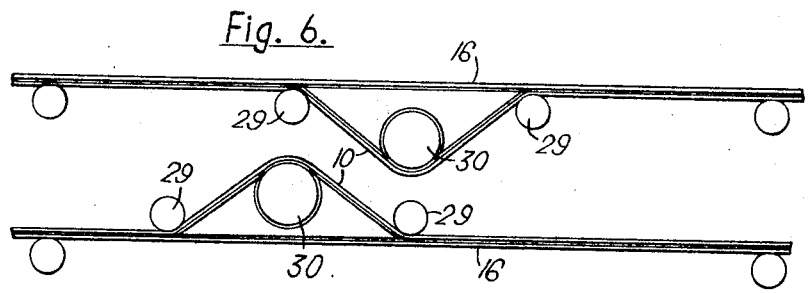
Inventor
Charles Thomson
By Stevens, Davis, Miller + Mosher
Attorneys United States Patent Office 3,268,065
Patented August 23, 1966

3,268,065
COUPLED DRIVE MEANS FOR BELT CONVEYORS
Charles Thomson, Esher, Surrey, England, assignor to Solar Thomson Engineering Company Limited, Surrey, England
Filed Dec. 23, 1963, Ser. No. 332,519
Claims priority, application Great Britain, Dec. 24, 1962, 48,550/62
4 Claims. (Cl. 198—203)

This invention relates to improvements in belt conveyors.

The primary object of the present invention is to provide for conveying materials in an economic manner where the distance over which the material is to be conveyed or the height to which the material has to be lifted is such that known conveying means would be expensive in capital cost or in maintenance, or troublesome in operation.

According to the invention, in a belt conveyor having an endless conveyor belt and a plurality of shorter endless driving belts arranged along it, in contact over substantially its whole length with at least the central portion of the under-surface of its load-carrying flight, so as to drive the conveyor belt by the friction between them, the driving belts have their own motor drives and are provided with means independent of the conveyor belt arranged to ensure that when the loading on the conveyor changes all the driving belts change speed by the same amount.

Preferably, the conveyor has positive mechanical interconnexion between end drums of adjacent driving belts.

In a modified form of the invention, the same results are secured by using, instead of the plurality of shorter driving belts, a driving belt with motor drives at spaced points along it. In this case, the driving belt itself is available to transfer excess power from less heavily loaded to more heavily loaded parts of the conveyor, and may accordingly be the only means provided for ensuring that, when the loading on the conveyor changes, all the driving belts change speed by the same amount.

In both forms, an advantage is that, as the conveyor belt is merely required to provide a conveying surface and to have resistance to impact at the loading points and is cushioned by the driving belts or belt, the conveyor may be arranged so that a light single or two ply conveyor belt with covers is adequate, effecting a considerable saving in cost.

A further advantage is that the driving belt or belts, unlike customary conveyor belts, need not trough and are not liable to suffer damage by impact or by being folded-over. Thus the driving belts may readily be constructed with a carcass of high carbon steel covered with rubber or plastics material.

Yet a further advantage is that in a conveyor having three or more motor drives it is possible to design the system on the assumption that each driving belt or the driving belt requires to transmit only about 30% of the total horse-power of the motors of the conveyor, as compared with a customary high tensile conveyor belt for heavy duty which requires to be capable of transmitting all the horse-power.

Thus the invention offers possibilities of conveying materials in relatively economic and trouble-free manner over a distance or to a height which would be expensive in capital cost or in maintenance, or troublesome in operation, with known conveying means.

Figure 7:
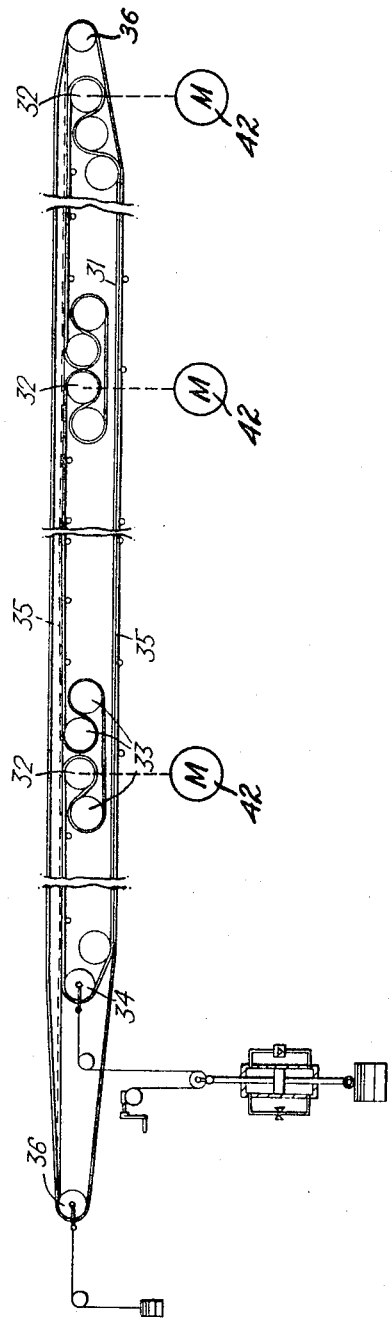

Two embodiments of the invention are illustrated by way of example only in the accompanying drawings in which:

FIG. 1 is a side elevation of the first embodiment;
FIG. 2 is an end view of means for centring the belts and for forming a trough in the conveyor belt;
FIG. 3 is an end view of a modification of the means illustrated in FIG. 2;
FIG. 4 is an end view of means alternative to that shown in FIG. 2;
FIG. 5 is an end view of a modification of the means illustrated in FIG. 2;
FIG. 6 is a further modification of the means illustrated in FIG. 2;
FIG. 7 is a side elevation of the second embodiment;
FIG. 8 is a fragmentary side elevation of a modification of the second embodiment;
FIG. 9 is a side elevation of a modification of the second embodiment; and
FIG. 10 is a plan view of the modification illustrated in FIG. 9.

Referring to FIGS. 1 to 6 of the drawings, a series of endless driving belts 10 arranged in tandem are each trained in sinuous manner around drums 11, 12, 13, 14 and 15. The drum 15 is driven by a motor 40. The drum 14 is movable longitudinally of the associated belt 10 to, for example, the position shown at 14¹ to take up any slack in the belt. An endless conveyor belt 16 common to all the driving belts 10 wraps said driving belts and is itself trained around end rollers 7 with the upper and the lower flights of the conveyor belt 16 in engagement with the upper and the lower flights of the driving belts 10, so that, during rotation of the driving belts, the conveyor belt 16 is rotated solely by frictional engagement with the driving belts.

The tractive effort that can be transmitted from the driving belt 10 to the conveyor belt 16 is a function of the weight pressing the belts 10, 16 together. On the lower flights, this is the weight of the driving belt 10. On the upper flights, it is the combined weight of the conveyor belt 16 and the load on the conveyor belt at that point. Since the tractive effort required increases with the loading of the conveyor, it should thus be possible to drive the conveyor belt by friction alone. In practice, however, difficulties arise when the conveyor is unequally loaded or unequally driven over its length (and in stopping or starting of the conveyor) which are overcome in the present embodiment by gearing 17 coupling together the adjacent drum 11, 15 of adjacent driving belts 10.

The nature of these difficulties and the purpose of this gearing may be understood by considering the effect of an increase of load at one point of the conveyor. The tractive effort required is thereby increased, which with a normal motor drive would result in a drop of speed (and increase of torque) of the motor driving the driving belt at that point. The remaining motors would continue to deliver, to the driving belts and hence to the conveyor belt, enough power to keep the remaining sections of the conveyor running at the former speed. Since all driving belts drive the same conveyor belt, and so run substantially at the same speed (the same speed, that is, apart from unavoidable differences between drums, and so on), the result would be (in the absence of the gearing 17) that the driving belts would all be held to the same speed by the conveyor belt; that is to say, that the conveyor belt would transfer enough power from the lightly-loaded to the heavily-loaded portions of the conveyor to make the loading on all the motors the same. In the practical operation of the conveyor of the invention, the amount of transfer of power needed will normally be reduced (especially when starting and stopping the conveyor, which tends to add to these difficulties) by switching motors in and out as the loading requires; but this cannot provide a complete answer, particularly since the undriven sections of the conveyor need to draw some power from other sections. To some extent the difficulty could be overcome bp providing a conveyor belt of heavy construction, capable of carrying a considerable part of the total driving power of the conveyor, but this again (apart from being costly) fails to provide a complete solution. It will be understood that the relation between conveyor loading and the tractive effort required, mentioned above, applies only on the average. With some parts of the belt heavily and some lightly loaded, and with all motors running at approximately the same speed and so developing approximately the same power, some motors will (in the absence of the gearing 17) be required to deliver large amounts of power to a lightly-loaded portion of conveyor belt, and slipping would result which is not acceptable. To avoid this, whilst retaining the friction drive between driving and conveyor belts, the invention calls for means which reduce the power delivered to the lightly-loaded parts of the conveyor belt, and increase the power delivered to the heavily-loaded parts, until all run at the same speed without being constrained to do so by tensions in the conveyor belt. In the present embodiment, this function is performed by the gearing 17. By this gearing, excess power at lightly-loaded points is transferred through the driving belts and the gears to other points without being delivered to the conveyor belt. Thus the conveyor belt may be lightly constructed and the danger of slipping mentioned above is overcome. The driving belts must be able to take the transferred power as well as the power used locally, but in a practical design using three or more drives it should be sufficient to provide a driving belt able to handle 30% of the total power. It will be apparent to those in the art, after what has been said, that on the one hand this requirement could be reduced, by suitable control of the motor drives so as to deliver less power to the driving belts where the load is light (or the tractive effort required small) and more power where the load is heavy (or the tractive effort great); whilst on the other hand, the function performed by the gearing 17 could be performed otherwise, for instance electrically. In more sophisticated systems, these two expedients could be combined. It is preferred, however, to avoid the use of complex electrical controls, except on the longest conveyors, on which the power handling capacity required of the driving belts would otherwise become impracticably great. Even so, it is preferred to retain the direct mechanical inter-connexion between sections (such as the gearing 17) and to use more sophisticated techniques merely to reduce the power carried through the gearing.

The conveyor belt 16 is of greater effective width than the driving belts 10, the marginal edge portions 18 of the upper flight of the conveyor belt 16 being each supported on a plurality of longitudinally spaced idler rollers 19 (FIGS. 2 and 3) inclined downwardly towards the driving belts 10 whereby said marginal edge portions 18 form with the central part a trough 20 for material to be conveyed, the trough 20 resting on longitudinally spaced idler rollers 21. As the driving belts engage only the central part of the conveyor belt, the amount of weight pressing on the driving belts to provide a tractive force between the belts is reduced. In order to neutralise this reduction in weight, the engaging faces of the belts are formed with meshing patterns, for example, longitudinal grooves 22, which not only increase the frictional engagement of said engaging faces in a longitudinal direction but positively prevent lateral movement of the conveyor belt 16 relative to the driving belts 10.

Where the angle formed by each marginal edge portion 18 and the central part of the conveyor belt 16 is to be in excess of about 30° in order to provide an increased conveying capacity for the belt and/or to reduce spillage, the stiffness of the belt reduces the percentage of the effective weight of the belt 16 supported by the driving belts 10 and thus the tractive force between the belts, particularly when there is no load on the conveyor belt. In order to overcome this disadvantage, the upper flights of the driving and the conveyor belts rest as shown in FIG. 3 on the longitudinally spaced central rollers 21 associated with the idler rollers 19 and each roller 21 is connected at both ends by a linkage 23 to the associated idler roller 19 each of which is mounted on a fulcrum 24 for pivotal movement about an axis parallel to the longitudinal axis of the conveyor. The linkages 23 are such that, when there is no load on the conveyor belt, as shown at the left hand side of FIG. 3, the central rollers 21 are supported by the inclined idler rollers 19 and support the belts, the angles defined with the central part of the conveyor belt by the marginal edge portions 18 being small. When the load on the conveyor belt increases, the central rollers sink as shown at the right hand side of FIG. 3 and, by way of the linkages 24, pull the associated idler rollers 19 upwardly and towards one another to form a deep trough. Spring means (not illustrated) may be provided to augment or to replace the linkage.

In lieu of idler rollers, the marginal edge portions of the conveyor belt 16 may be provided with upstanding flanges 25 (as shown at the right hand side of FIG. 4) to provide a trough, or lateral reinforcing straps 26 of spring steel incorporated in the belt 16 (as shown at the left hand side of FIG. 4) at preselected centres may be bent at said edge portions to provide a trough, it being understood that during travel of the belt 16 around the end drum, the tension in the belt will straighten the straps.

In order more positively to locate the conveyor belt relative to the driving belts, some or all of the drums 11 to 15 for the driving belts may be formed as shown in FIG. 5 with axially spaced circumferential ribs 27, the face of each driving belt 10 engaging the drums being formed with longitudinal grooves 28 engageable by the ribs 27 or each driving belt being in sections maintained in position around the drums by the ribs. It is preferred, however, to use the same ribbed surfaces that (as at 22 in FIG. 2) are provided between the driving and conveyor belts to hinder also lateral wandering of the two belts together. This may be achieved by providing a correspondingly patterned surface in drums engaging the outer surface of the driving belt. A particularly advantageous arrangement is shown in FIG. 6, where the upper and the lower flights of each driving belt 10 each pass between the conveyor belt 16 and two rollers 29 spaced apart by a roller 30 vertically spaced from the conveyor belt 16 and formed circumferentially with a pattern intended to mesh with the pattern in the driving belt 10, the part of the upper flight of the driving belt between the two associated rollers 29 passing under the associated patterned roller 30 and the part of the lower flight of the driving belt between the two associated rollers 29 passing over the associated patterned roller 30. Alternatively, such patterned rollers may be arranged to engage with the lower surface of the upper flight of the conveyor belt, and if desired also with the upper surface of the lower flight of the conveyor belt, at points where these surfaces are not in contact with driving belts. Thus, in each of these last two arrangements, the same shaped surface on the one belt as engages with the other belt, also serves to hinder the first belt from wandering. As a further alternative, both belts could engage with rollers or drums in this way.

Referring to FIGS. 7 to 9, an endless driving belt 31 is trained in sinuous manner around a series of driving drums 32 spaced apart in tandem. Each driving drum 32 is associated with idler drums 33 to maintain the belt 31 taut. The left hand end of the belt 31 as shown in FIG. 7 is trained around an end drum 34 associated with a tensioning mechanism which forms no part of the present invention. An endless conveyor belt 35 wraps the driving belt 31 and is itself trained around end rollers 36 with the upper and the lower flights of the conveyor belt 35 in engagement with the upper and the lower flights of the driving belt 31, so that, during rotation of the driving belt, the conveyor belt 35 is rotated solely by frictional engagement with the driving belt. Each driving drum 32 is driven by a motor 42 each of which generates the same horse-power, tensioning means being associated with any one or all of the drums. It is an advantage of this embodiment that where one part of the conveyor belt 35 is heavily loaded, any excess power available in other parts of the conveyor will be transmitted by the driving belt 31 to said heavily loaded part substantially in the manner described in connection with the first embodiment, but without the need for gearing. In this embodiment also, it is possible to reduce the power that the driving belt is required to handle, by controlling the motor drives so as to deliver more power where the conveyor is heavily loaded, but as before, it is preferred except with the longest belts to rely solely upon the direct transfer of power by the driving belt.

If desired, the driving belt 31 may be in sections 31¹ as illustrated in FIGS. 9 and 10 trained around the driving drums 32 which are common to all the sections.

The means for forming a trough in the conveyor belt may be the same as described in connection with the first embodiment, and as with the first embodiment it is preferred to increase the driving friction, and hinder lateral wandering of the belt, by providing ribs or other suitably shaped interengaging surfaces on the two belts, these surfaces also engaging with ribbing or other appropriate patterning on a drum or roller. As illustrated, the patterned drums would be those drums 33 engaging the outer surface of the driving belt; but the preferred arrangement of FIG. 6 is equally applicable to the present embodiment.

Other possible forms of the invention will be apparent from what has been said above. In particular, for the longest belts, a single conveyor belt could be driven by small number of driving belts, each arranged according to the second of the above described embodiments. The sections could be interconnected as in the first of the above-described embodiments, or electrically. Or a long conveyor belt could be driven in several sections, each according to the first embodiment, interconnected electrically. Or a single long driving belt could be provided at intervals with tensioning devices similar to that associated with the end drum 34 of the second embodiment: thus, in effect, dividing the driving belt into sections such that the driving belt itself does not transmit power from one section to the next; the sections being interconnected as in the first embodiment, or electrically.

I claim:

1. A belt conveyor comprising an endless conveyor belt, the inner surface of which is patterned; means for driving said belt, said means extending over substantially the whole length and over substantially the whole of at least the central portion of the load-carrying flight of said conveyor belt, said means comprising at least one endless driving belt having a patterned surface complementary to and in frictional engagement with that of said conveyor belt; a plurality of prime movers for actuating said driving means; power distributing means independent of the conveyor belt driving coupling adjacent prime movers; and at least one roller having a patterned surface complementary to said patterned surface of said driving belt, said driving belt passing around said roller with said patterned surfaces in frictional engagement.

2. The conveyor of claim 1 wherein each of said patterned surfaces has complementary ribs and grooves.

3. The conveyor of claim 1 wherein said driving means comprises a plurality of endless driving belts and further comprising a plurality of end drums, each of said driving belts passing around a corresponding end drum, said power distributing means comprising a mechanical coupling between adjacent end drums.

4. The conveyor of claim 1 wherein said driving means comprises a single endless driving belt which couples said prime movers and constitutes said power distributing means.

References Cited by the Examiner

UNITED STATES PATENTS

| | | | |
|---|---|---|---|
| 781,138 | 1/1905 | Etcheverry | 198—201 |
| 809,227 | 1/1906 | Steckel | 198—192 |
| 1,313,111 | 8/1919 | Page | 198—203 |
| 1,626,041 | 4/1927 | Kyle et al. | 198—203 |
| 1,636,986 | 7/1927 | Caldwell | 198—203 X |
| 1,726,555 | 9/1929 | Gammeter | 198—203 |
| 1,847,152 | 3/1932 | Webb et al. | 198—203 |
| 2,105,824 | 1/1938 | Simonds | 198—203 X |
| 2,301,098 | 11/1942 | Twyman. | |
| 2,304,419 | 12/1942 | Pratt | 198—203 |
| 2,563,427 | 8/1951 | Scott | 198—203 X |
| 2,594,342 | 4/1952 | Pettyjohn | 198—201 |
| 2,625,257 | 1/1953 | Schenk | 198—203 |
| 2,744,618 | 5/1956 | Seal | 198—203 |
| 2,794,536 | 6/1957 | Da Roza et al. | 198—203 X |
| 2,863,555 | 12/1958 | Jaritz | 198—203 |
| 3,101,145 | 8/1963 | Koski et al. | 198—203 |

EVON C. BLUNK, *Primary Examiner.*

SAMUEL F. COLEMAN, *Examiner.*

R. KRISHER, *Assistant Examiner.*